Patented Oct. 19, 1943

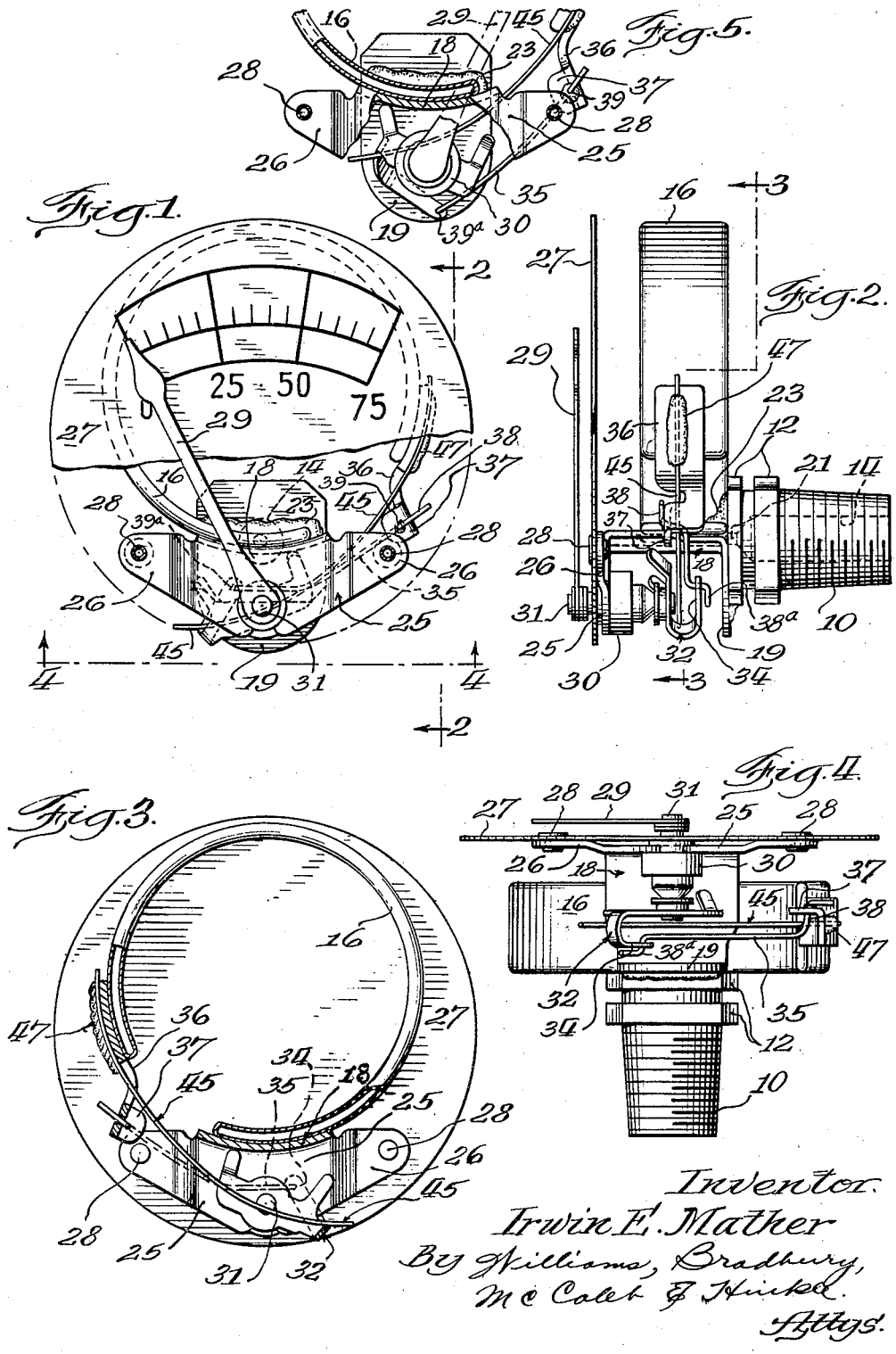

2,332,103

UNITED STATES PATENT OFFICE 2,332,103

PRESSURE GAUGE

Irwin E. Mather, Chicago, Ill., assignor to Stewart-Warner Corporation, Chicago, Ill., a corporation of Virginia Application December 4, 1939, Serial No. 307,376

4 Claims. (Cl. 73—109)

My invention relates to fluid pressure measuring devices such as the oil pressure gauges commonly employed in automotive vehicles for the measurement of lubricant pressure. Such pressure gauges usually employ a pressure responsive means, such as the well known Bourdon tube, one end of which is fixed and in communication with the source of pressure to be measured, and the other end of which is connected to a pressure indicating pointer by a mechanical linkage.

One of the long prevalent disadvantages attending the use of these meters has been the inaccuracy resulting from the lost motion or slack in the linkage connecting the Bourdon tube to the indicating element. Although attempts have been made to eliminate lost motion between the joints of the various linkages employed, by the use of springs connecting the several parts of the linkages, these attempts were never quite successful. The stresses imposed upon the linkage by the springs as applied to linkages prior to my invention, tended to affect the accuracy of the pressure indications given by the indicating element under the influence of the Bourdon tube. Furthermore, a plurality of springs was required in order to remove the slack from all joints of the linkage.

Another difficulty encountered with the prior art was the tendency of the slack relieving springs unequally to affect the indications of the pressure gauge at different degrees of deflection of the instrument. For instance, the springs as usually disposed oppose the pull of the Bourdon tube with less force at slight deflections thereof than when the Bourdon tube is deflected to a larger extent by the application of a larger fluid pressure.

One of the objects of my invention is to provide a pressure gauge of extremely simple and economical construction, but more accurate than has hitherto been thought possible.

Another object of my invention is to eliminate lost motion in the mechanical linkages of pressure gauges.

Another object of my invention is to provide means for taking up the slack in the mechanical movements of pressure gauges by means exerting an equal or substantially equal compensating effect over the entire range of the instrument.

Further objects and advantages of my invention will become apparent upon reading the following specification, in conjunction with the accompanying drawing, in which:

Fig. 1 is a face view of a pressure gauge according to my invention, with a portion of the dial broken away to show the underlying mechanical structure of the instrument;

Fig. 2 is a side elevation of a pressure gauge according to my invention, looking along the lines 2—2 of Fig. 1;

Fig. 3 is a sectional view of a pressure gauge according to my invention along the line 3—3 of Fig. 2;

Fig. 4 is a bottom plan view of a pressure gauge, taken along the lines 4—4 of Fig. 1; and Fig. 5 is a fragmentary face view of a pressure gauge embodying an alternative arrangement of my invention.

In all of the figures like reference numerals refer to similar parts.

A pressure gauge embodying my invention may consist of a threaded nipple 10 provided with flanges 12, which support the body of the instrument and which are useful for mounting the instruments upon a vehicle dashboard or other supporting structure. The nipple 10 is provided with a bore 14 for conveying the fluid whose pressure is to be measured. The bore 14 communicates with a circular Bourdon tube 16 of flat cross-section, one end of which tube is suitably mounted upon a bracket 18 by means of solder or by welding it to the bracket.

The depending flange 19 of bracket 18 is fastened to the flange 12 of nipple 10 at such a height that the end of the Bourdon tube 16 mounted upon the bracket 18 is aligned with the bore 14 of nipple 10. A small aperture 21 in the edge of the Bourdon tube is aligned with bore 14 and is in communication therewith. The joint between the bore and the aperture is rendered fluid-tight by the judicious disposition of a small quantity of solder 23 which serves, at the same time, to help fasten the Bourdon tube to the flange 12.

The Bourdon tube 16 is a little short of a complete circle. The free end of the tube may be closed against loss of the pressure-producing fluid by means of a small quantity of solder. The Bourdon tube tends to expand, that is, to become flatter or of larger diameter as fluid pressure is applied to the nipple 10. I lay no claim to the principle of operation of the Bourdon tube, for this is a well known expedient in the art of pressure measurement.

Bracket 18 bears a downwardly depending flange 25 provided with lugs 26 upon which a calibrated dial 27 is mounted by means of rivets 28. The flange 25 mounts a bushing 30 in which is journaled a pivot 31 carrying an indicator needle 29 on one end thereof. The other end of the pivot 31 carries a generally U shaped crank 32. This crank is actuated by a link 35 joining one arm 34 of the said crank 32 to a lug 37 of bracket 36 mounted upon the free end of the Bourdon tube 16. Link 35 may consist of a light piece of wire provided with appropriate hooks 38 and 38a for engaging suitable holes 39 and 39a, respectively, in the lug 37 and the pivot crank 32, respectively. Lightness is a desirable characteristic of the link and of all of the moving parts of the instrument assembly. Consequently, the design must be of the utmost simplicity.

There must always be a certain amount of slack or lost motion in the instrument movement, because the link 35 must be somewhat loosely attached to crank 32 and lug 37 to allow free movement without the use of lubricants. This slack is very objectionable because it is greatly magnified before being transmitted to the indicating needle 29, which therefore suffers from a large amount of play.

It has been attempted to overcome this lost motion by the use of a coil or spiral spring reacting against the pivot in a direction opposed to its rotation under the influence of the pressure responsive element. The disadvantage of this arrangement lies in the different influence of the spring upon the instrument at high and low readings. At low readings the coiled spring that has been used in previous constructions will be under greater tension than at high readings, because at high readings the coil has partially unwound. Consequently, an unequal compensating effect is exerted upon the movement of the instrument, necessitating a specially calibrated dial. Such an unequal compensating effect practically offsets the advantage of overcoming the slack in the instrument, because the chief advantage accruing from the use of an expensive Bourdon tube is its very valuable property of giving indications, that is, deflections, entirely proportional to the pressure applied, at least for reasonable ranges of pressure. Consequently, a dial having equal divisions requiring no prior calibration may be used with the instrument. The addition of the conventional compensating spring negatives these advantages.

I have provided my pressure gauge with means for taking up lost motion in the movement which, nevertheless, does not affect the accuracy of the instrument. This means consists of a delicate leaf spring or a short piece of spring wire 45 suitably fastened by welding or by a small quantity of solder 47 to the bracket 36 or to the end of the Bourdon tube 16. The free end of the spring 45 is slightly deflected in order resiliently to stress it, and reacts against the U shaped crank 32 in a direction opposed to the pull due to the Bourdon tube 16. I wish to stress the importance of mounting the spring 45 upon the end of the Bourdon tube so that the spring moves along with the tube, thereby avoiding any substantial unequal compensating effect.

I am not confined to the structure of the pressure gauge described, but may embody my invention in various other forms of which Fig. 5 is an illustration. The instrument there depicted is a pressure gauge wherein the pointer moves counter-clockwise with an increase of pressure, otherwise similar to the one described previously. This necessitates the use of a spring 45 tensioned and disposed in a slightly different manner. As will be seen from Fig. 5, the spring exerts an upward pressure as well as being upwardly curved in order to stress the instrument movement in a direction opposed to the force due to the Bourdon tube 16.

I am enabled to apply my novel means for improving the accuracy of operation of indicating instruments to others than those described, and I therefore wish to be limited only by the following claims:

1. A pressure gauge comprising a threaded nipple, a bracket mounted thereupon, a pivot bearing carried by said bracket, a pivot carried by said bearing and provided with an indicator needle on one end portion thereof, a U shaped crank carried upon the other end portion of said pivot, a C shaped Bourdon tube one end of which is affixed to said nipple and in communication with the bore thereof, a link joining the free end of said Bourdon tube and one arm of said crank, and a resilient wire or leaf spring carried by the free end of said Bourdon tube, and reacting against the crook of said U shaped crank in a direction opposed to motion under the influence of said Bourdon tube.

2. A pressure gauge comprising a nipple, a pointer movably mounted on said nipple, a Bourdon tube having one end communicating with said nipple and having a second free end, a link connected to the free end of said Bourdon tube, crank means connecting said pointer with said link for operating said pointer upon movement of the free end of said Bourdon tube, and a leaf spring having one end connected to the free end of said Bourdon tube and having its opposite end freely engaging said crank and exerting a substantially uniform force thereon in opposition to the force exerted through said link.

3. A pressure gauge comprising means responsive to fluid pressure, visual indicating means operated thereby, resilient means comprising a leaf spring carried by said pressure responsive means and exerting a force opposed to the movement of said indicating means under the influence of said pressure responsive means, a mechanical linkage connecting said indicating means and said fluid pressure responsive means, a sliding connection between said resilient means and said mechanical linkage whereby the point of contact between said resilient means and said linkage shifts lengthwise of said resilient means to vary the effective length of said resilient means and to exert a substantially uniform force on said mechanical linkage in opposition to the force exerted by the fluid pressure responsive means throughout the entire range of deflection.

4. A pressure gauge comprising a fixed bracket, a Bourdon tube mounted thereon at one end, a pivoted pointer mounted upon said bracket, a crank actuating said pointer, a link connecting the free end of the Bourdon tube to said crank, resilient means comprising a leaf spring connected to the free end of said Bourdon tube and opposing movement of said pointer under the influence of said Bourdon tube, and a variable driving connection between said resilient means and said crank, said variable driving connection shifting with different positions of said tube to provide a substantially uniform force exerted on said crank by said resilient means.

IRWIN E. MATHER,